United States Patent [19]

Duda

[11] Patent Number: 5,797,103
[45] Date of Patent: *Aug. 18, 1998

[54] METHOD AND APPARATUS FOR INFORMING A REMOTE UNIT OF A FEATURE-ORIGINATED CALL

[75] Inventor: Michael Duda, Naperville, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 663,967

[22] Filed: Jun. 14, 1996

[51] Int. Cl.$^6$ .................... H04B 1/38; H04M 3/42
[52] U.S. Cl. .................. 455/567; 455/413; 455/414; 455/466
[58] Field of Search .................. 455/54.1, 54.2, 455/67.1, 67.7, 343, 412, 413, 414, 415, 416, 417; 379/57, 58, 59, 60, 63, 89

[56] References Cited

U.S. PATENT DOCUMENTS

| | | |
|---|---|---|
| 5,117,780 | 6/1992 | Kasper et al. ................ 455/413 |
| 5,128,938 | 7/1992 | Borras ........................ 455/343 |
| 5,313,515 | 5/1994 | Allen et al. .................. 379/59 |
| 5,526,401 | 6/1996 | Roach, Jr. et al. ............ 379/57 |
| 5,577,103 | 11/1996 | Foti ........................... 379/63 |
| 5,579,372 | 11/1996 | Astrom ....................... 379/58 |
| 5,613,213 | 3/1997 | Naddell et al. ............... 455/54.1 |

*Primary Examiner*—Edward F. Urban
*Assistant Examiner*—Sam Bhattacharya
*Attorney, Agent, or Firm*—Kenneth A. Haas

[57] ABSTRACT

Notification of a feature-originated call is provided to a remote unit (103) by determining a feature indication message (312) based on a feature-originated call, and sending the remote unit (103) the feature indication message (538). The feature indication message is sent to the remote unit (103) via a base station (101) utilizing a downlink communication signal (116). In a preferred embodiment the feature indication message consists of a predetermined text message transmitted to the remote unit (103) and is displayed by the remote unit (103) on an alpha-numeric display.

15 Claims, 5 Drawing Sheets

METHOD AND APPARATUS FOR INFORMING A REMOTE UNIT OF A FEATURE-ORIGINATED CALL

FIELD OF THE INVENTION

The present invention relates generally to wireless communication systems and, in particular, to informing a remote unit in a wireless communication system of a feature-originated call.

BACKGROUND OF THE INVENTION

Wireless communication systems are known to comprise feature services such as voice mail, caller identification, call forwarding, etc. In particular, when a feature-originated call is placed to a remote unit (e.g., a mobile or stationary remote unit), the receiver of that call has no indication that a feature-originated call has been placed, and typically will answer the call as if a third party were trying to contact them. For many feature-originated calls (such as voice-mail notification), the called party will have to pay unnecessary fees by answering the feature-originated call since their feature service may be accessed via the Public Switched Telephone Network (PSTN) at a typically much lower cost.

In other feature-originated calls (such as transmission of data or facsimile), the called party will answer the call without attaching the necessary equipment to the remote unit, often resulting in a dropped call. Even if the necessary equipment can be attached to the remote unit without the call being dropped, at a minimum the user is billed for the air time while connecting the necessary equipment.

Thus a need exists for a method and apparatus for informing a remote unit of a feature-originated call.

DETAILED DESCRIPTION OF THE PREFERRED EMBODIMENTS

Stated generally, notification of a feature-originated call is provided to a remote unit by determining a feature indication message based on a feature-originated call and sending the feature indication message to the remote unit. The feature indication message is sent to the remote unit utilizing a base station and a downlink communication signal. In a preferred embodiment the feature indication message consists of a predetermined text message transmitted to the remote unit and is displayed by the remote unit on an alpha-numeric display.

The present invention encompasses a method for informing a remote unit of a feature-originated call by determining that a feature service needs to be provided to the remote unit and determining an availability of the remote unit. Next, a feature indication message is determined based on the feature service determination and a time period is determined in which the feature indication message is to be sent to the remote unit. Finally the feature indication message is sent to the remote unit based on the feature service determination, the availability of the remote unit, and the time period determination. By informing a remote unit that an incoming call is a feature-originated call, the called party may avoid unnecessary fees by refusing to answer the call since their feature service may be accessed via a PSTN at a typically much lower cost.

An alternate embodiment encompasses a method for informing a remote unit of a feature-originated call by determining that a feature service needs to be provided to the remote unit and determining an availability of the remote unit. A feature indication message is determined based on the feature service determination, and a time period to send the feature indication message is determined. Next, the remote unit is contacted via a downlink communication signal and supplied the feature indication message via the downlink communication signal.

Yet another embodiment encompasses an apparatus for informing a remote unit of a feature-originated call. The apparatus comprises a Mobile Switching Center (MSC) for determining an availability of the remote unit, a trigger manager coupled to the MSC, the trigger manager determining a feature indication message based on a call, the trigger manager additionally determining a time period to send the feature indication message to the remote unit, a controller coupled to the MSC for contacting the remote unit via a downlink communication signal, and a base station coupled to the MSC, the base station supplying the remote unit the feature indication message via a downlink communication signal.

Figure 1:
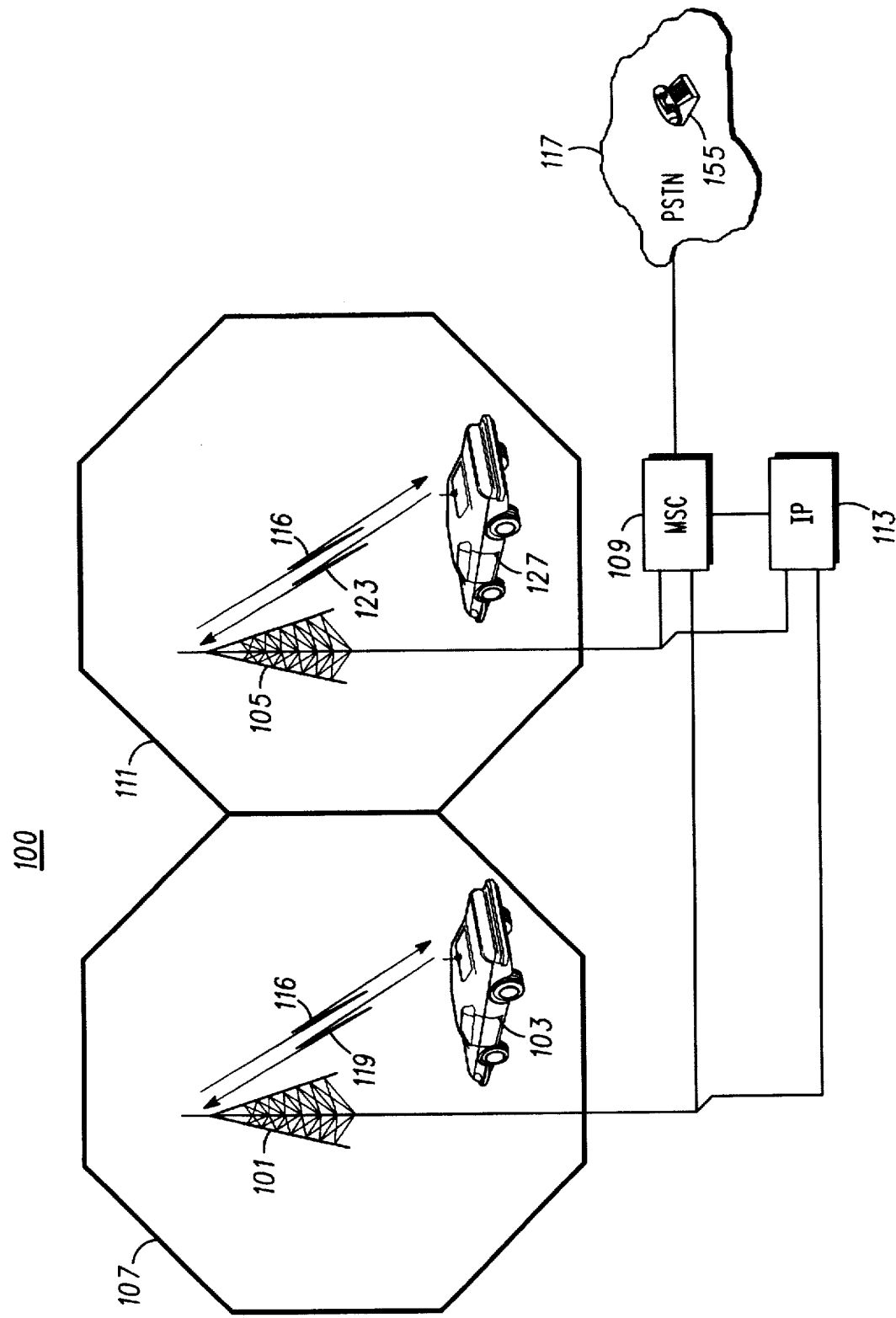
FIG. 1 is a wireless communication system in accordance with a preferred embodiment of the invention.

FIG. 1 illustrates wireless communication system 100 in accordance with a preferred embodiment of the present invention. Although communication system 100 is capable of supporting many feature services, a preferred embodiment of the present invention will be described as it relates to a voice mail feature-originated call. Wireless communication system 100 is preferably a cellular communication system 100 which may be an analog or digital cellular communication system 100, such as Advanced Mobile Phone Service (AMPS) system, Code Division Multiple Access (CDMA) system, Global System for Mobile Communications (GSM) system, the Personal Digital Cellular (PDC) system, or the United States Digital Cellular (USDC).

Cellular communication system 100 includes wireless infrastructure equipment including base stations 101 and 105 which may be Motorola GSM base stations, having respective service coverage areas 107 and 111. As shown, cellular communication system 100 includes remote unit 103 (sometimes referred to as a subscriber unit which is operated by a remote subscriber) communicating with base site 101 via uplink communication signal 119 and with downlink communication signal 116. Additionally, communication system 100 includes remote unit 127 communicating with base site 105 via uplink communication signal 125 and via downlink communication signal 123. Base stations 101 and 105 are suitably coupled, as is well known, to at least mobile switching center (MSC) 109 and intelligent peripheral (IP) 113. In a preferred embodiment, MSC 109 is a Motorola Electronic Mobile Exchange (EMX) 2500 and IP 113 is a GSM Short Message Service Center manufactured by Aldiscon Telepath. In the preferred embodiment, MSC 109 is suitably coupled to both IP 113 and public switched telephone network (PSTN) 117, but it is contemplated that MSC 109 can be suitably coupled to both IP 113 and other network communication devices as well. As shown, PSTN 117 contains communication unit 155.

Operation of cellular system 100 in accordance with a preferred embodiment of the invention occurs as follows. A call attempt is made to remote unit 103. The call attempt may originate from PSTN (i.e. from communication unit 155) or may originate from cellular system 100 (i.e. from remote unit 127). MSC 109 determines remote unit's 103 availability and, if necessary, attempts to locate remote unit 103 via downlink communication signal 116 sent to the last base station that remote unit 103 was in communication with. If remote unit 103 is unavailable, MSC 109 determines a feature indication message (in this case a voice-mail identification message) and reroutes the call and the feature indication message to IP 113. If remote unit 103 has subscribed for voice-mail services, IP 113 directs the calling party to leave a message for remote unit 103. If a message has been left for remote unit 103, IP 113 sends a trigger message to MSC 109 informing MSC 109 that IP 113 should be notified when remote unit 103 next accesses cellular system 100.

When remote unit 103 accesses cellular system 100 (e.g. location registration, originating call attempt, releasing an existing call . . . etc.) via uplink communication signal 119, MSC 109 notifies IP 113 that remote unit 103 is available for communication. IP 113 then establishes a connection via base station 101 and downlink communication signal 116, to remote unit 103. Once connection has been established between IP 113 and remote unit 103, IP 113 sends a feature indication message to remote unit 103 informing remote unit 103 that a voice-mail message has been left. In a preferred embodiment the feature indication message consists of a predetermined text message transmitted to remote unit 103 and displayed by remote unit 103 on an alpha-numeric display. In a preferred embodiment the feature indication message is an alpha-numeric message "you have voice mail" that is displayed on an alpha-numeric display existing on remote unit 103. By informing remote unit 103 that an incoming call is a feature-originated call, the called party may avoid unnecessary fees by refusing to answer the call since their voice-mail service may be accessed via PSTN 117 at a typically much lower cost.

In an alternate embodiment, if remote unit 103 is utilizing Cellular System Remote Unit-Base Station Compatibility Standard of the Electronic Industry Association/Telecommunications Industry Association Interim Standard 95 (TIA/EIA/IS-95A), IP 113 may send an "Alert w/Info" order to remote unit 103 containing the text message in the "display" element, or may utilize a "short message service" to send the text message to remote unit 103. Additionally, if remote unit 103 is operating utilizing an IS-91 system protocol, IP 113 will send an Extended Protocol Message Order (sometimes referred to as a "Short Message") containing the predetermined text message to remote unit 103 followed by an Alert Order. In a preferred embodiment, messaging may be accomplished via a control channel or traffic channel utilizing the appropriate air interface and system protocol. EIA/TIA can be contacted at 2001 Pennsylvania Ave. NW Washington, D.C. 20006. Both EIA/TIA/IS-95-A and EIA/TIA/IS-91 are incorporated herein by reference. Once the information has been successfully delivered to remote unit 103, IP 113, instructs MSC 109 to clear the trigger message and hands control of remote unit 103 back to MSC 109.

Figure 2:
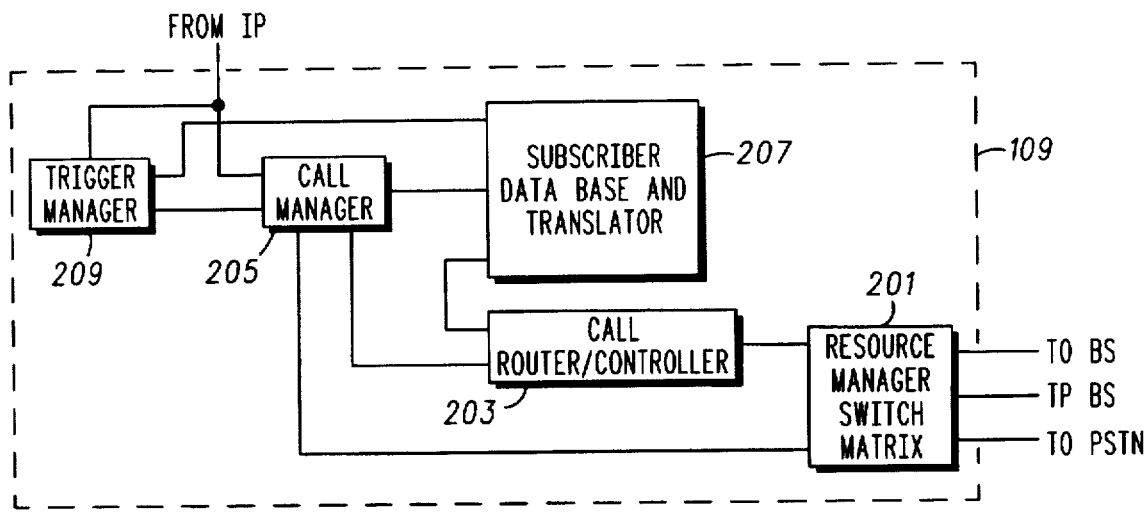
FIG. 2 is a block diagram illustrating the mobile switching center of FIG. 1.

FIG. 2 is a block diagram illustrating MSC 109 of FIG. 1. MSC 109 comprises trigger manager 209, call manager 205, subscriber database/translator 207, call router/controller 203, and resource manager/switch matrix 201. In a preferred embodiment, resource manager/switch matrix 201 is coupled to both call router/controller 203 and call manager 205 and call router/controller 203 is suitably coupled to both call manager 205 and subscriber database/translator 207. Resource manager/switch matrix 201 has outputs to base stations 101 and 105 and to PSTN 117. Trigger manager 209 (preferably a microprocessor based controller) is coupled to both call manager 205 and subscriber database/translator 207. Call manager 205, subscriber database/translator 207, and router/controller 203 are preferably microprocessor based controllers as described in Bellcore publication "Advanced Intelligent Network (AIN) 0.2 Switch-Intelligent Peripheral Interface (IPI) Generic Requirements" dated November, 1993.

Figure 3:
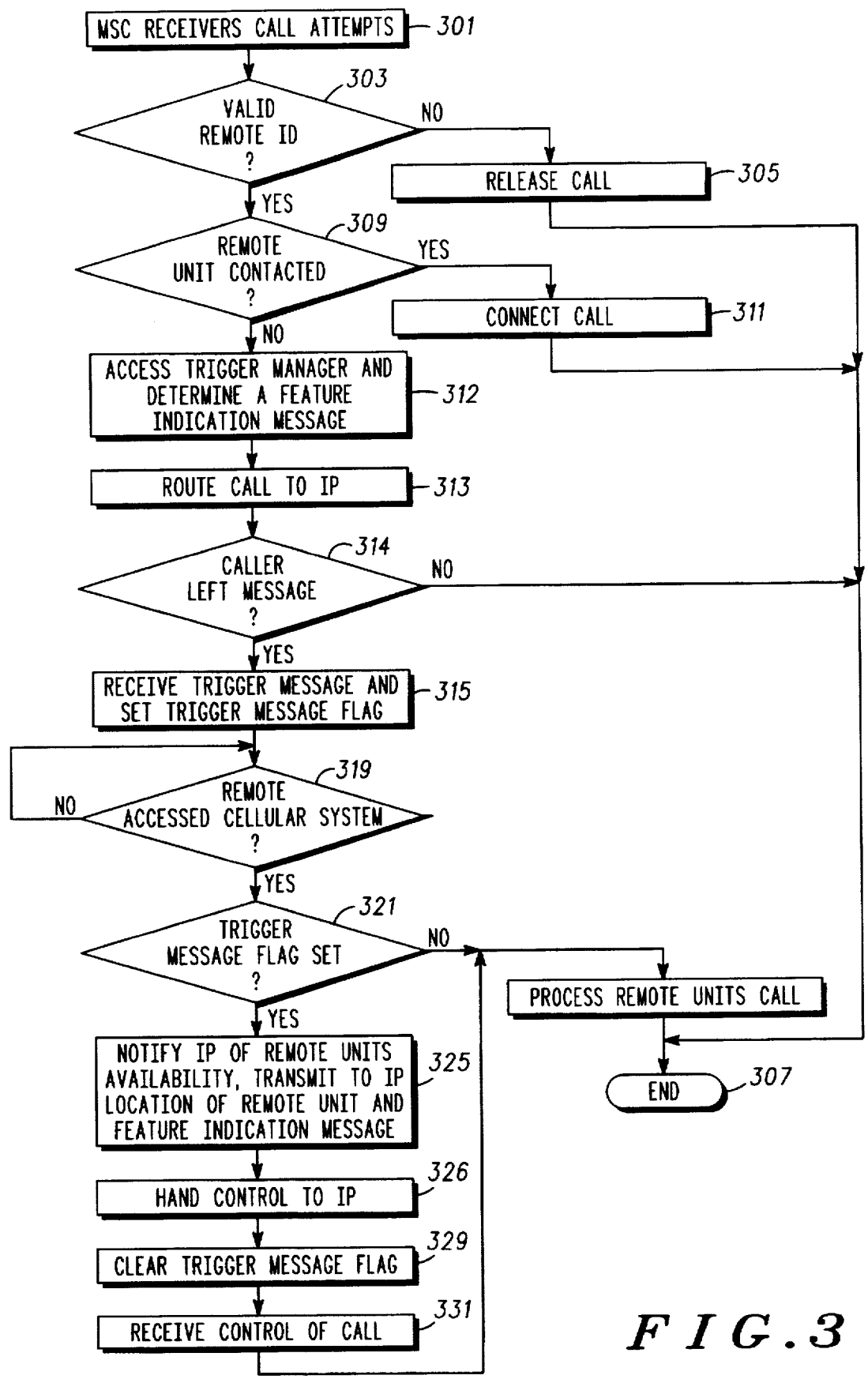
FIG. 3 is a flow chart illustrating a preferred method of operating the mobile switching center of FIG. 1.

FIG. 3 is a flow chart illustrating a particular embodiment of operating MSC 109 of FIG. 1 and FIG. 2. The logic flow begins at step 301, where MSC 109 receives a call attempt. Next, at step 303 call manager 205 accesses subscriber database/translator subsystem 207 and determines if a valid mobile identification was supplied by the call attempt. If, at step 303, subscriber database/translator 207 determines that the mobile identification is invalid, then at step 305, MSC 109 releases the call attempt, and the logic flow ends at step 307. If, at step 303, subscriber database/translator 207 determines that the mobile identification is valid, then at step 309, call manager 205 attempts to contact remote unit 103. In the preferred embodiment, the step of contacting remote unit 103 is accomplished via downlink communication signal 116 which is transmitted from the last base station that remote unit 103 communicated with. In situations where remote unit 103 is involved in a call, the step of contacting remote unit 103 is accomplished via down link communication on the traffic channel currently being utilized by remote unit 103.

Continuing, if at step 309, call manager 205 successfully contacts remote unit 103, then at step 311, the call is connected, and the logic flow ends at step 307. If at step 309, call manager 205 fails to contact remote unit 103, then at step 312 call manager 205 accesses trigger manager 209 where trigger manager determines a feature indication message and a corresponding time for the message to be sent to remote unit 103. In a preferred embodiment the feature indication message consists of a text message that is sent to remote unit 103 via a short message service the next time remote unit 103 accesses communication system 100, but in an alternate embodiment the feature indication message is sent to remote unit 103 only during specific time periods (for example, during time periods that have lower billing rates).

Continuing, at step 313, the undelivered call is rerouted to IP 113. At step 315 MSC 109 receives a trigger message from IP 113 and sets a trigger message flag instructing MSC 109 to notify IP 113 the next time remote unit 103 accesses cellular system. Next, at step 317, subscriber database/translator 207 sets a trigger message flag (in a preferred embodiment, the trigger message flag is simply a bit stored in memory) to notify IP 113 the next time remote unit 103 accesses cellular system. At step 319 call manager 205 determines if remote unit 103 has accessed cellular system. In the preferred embodiment, access can be accomplished by a location registration, originated call attempt, or releasing an existing call.

If at step 319 it is determined that remote unit has not accessed cellular system, the logic flow returns to step 319, otherwise the logic flow continues to step 321 where subscriber database/translator 207 checks to see if the trigger message flag has been set to notify IP 113 of remote unit's 103 access to cellular system 100. If no trigger message flag has been set, then at step 323 call manager 205 continues processing the system access, and the logic flow ends at step 307. If at step 321 a trigger message flag has been set, then at step 325 call manager 205 notifies IP 113 that remote unit 103 is available and transmits to IP 113 the location (i.e. current base station) of remote unit 103 along with the feature indication message. Next, at step 326, call manager 205 hands control of remote unit 103 to IP 113 which transmits a feature indication message to remote unit 103, and at step 329, subscriber database/translator 207 clears the trigger message flag. The logic flow continues to step 331, where call manager 205 receives control of remote unit 103 from IP 113, and continues processing remote unit's 103 system access.

Figure 4:
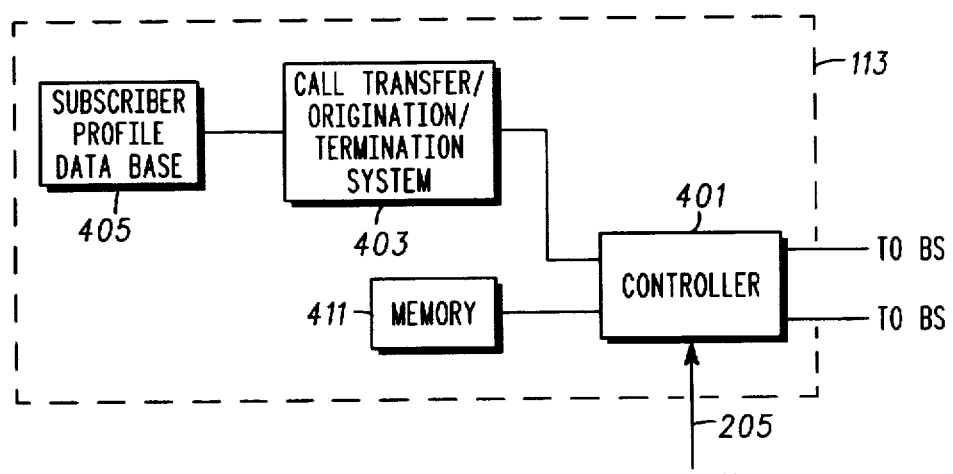
FIG. 4 is a block diagram illustrating the intelligent peripheral of FIG. 1.

Referring to FIG. 4, a block diagram of a preferred embodiment of IP 113 of FIG. 1 is illustrated. IP 113 includes controller 401 (such as a microprocessor based controller), a memory serving as subscriber profile database 405, call transfer/origination/termination (CTOT) system 403, and memory 411. In a preferred embodiment controller 401 has outputs to base station 101 and base station 105 and has an input from call manager 205. Controller 401 is suitably coupled to CTOT system 403 with CTOT system 403 coupled to subscriber profile database. Additionally, memory 411 is coupled to caller controller 401. Controller 401, subscriber profile database 405, and (CTOT) system 403 are preferably those as described in Bellcore publication "Advanced Intelligent Network (AIN) 0.2 Switch-Intelligent Peripheral Interface (IPI) Generic Requirements" dated November, 1993. This document can be obtained from Bellcore Customer Service, located at 8 Corporate Place, 3C183, Piscataway, N.J. 08854-4156.

Figure 5:
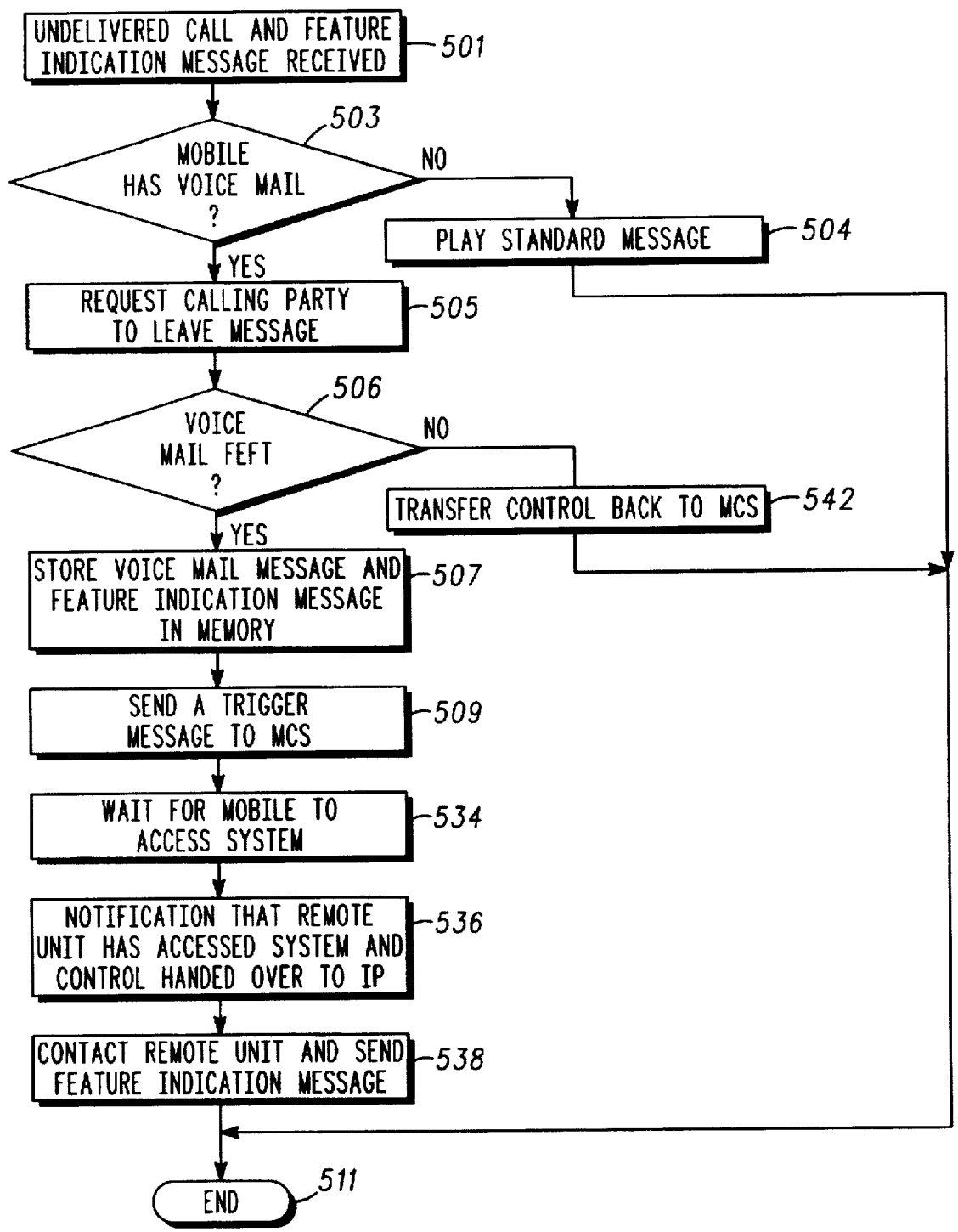
FIG. 5 is a flow chart illustrating a preferred method of operating the intelligent peripheral of FIG. 1.

FIG. 5 is a flow chart illustrating a method of operating IP 113 of FIG. 1 and FIG. 5. The logic flow begins at step 501 where controller 401 receives a rerouted undelivered call and a feature indication message from MSC 109. At step 503, controller 401 accesses CTOT system 403 which determines if remote unit 103 has voice-mail capabilities. In the preferred embodiment, CTOT system 403 accomplishes this by accessing the subscriber profile data base 405 that contains the services that remote unit 103 has associated with it. If, at step 503 it is determined that remote unit 103 has voice-mail capabilities, then at step 505 CTOT system 403 requests the calling party to leave a message and the logic flow continues to step 507 where the voice-mail message and feature indication message is stored in memory 411. The logic flow then continues to step 534 where controller 401 waits for remote unit 103 to access cellular system 100.

At step 536 MSC 109 notifies controller 401 that remote unit 103 has accessed cellular system 100 and MSC 109 hands control of remote unit 103 to controller 401. Next, at step 538, controller 401 contacts remote unit 103 via base station 101 and downlink communication signal 116. At this point controller 401 supplies remote unit 103 the feature indication message. As discussed above, in a preferred embodiment the feature indication message may be supplied via a short message service or "Alert w/Info" depending on the communication system protocol. Controller 401 accomplishes this by retrieving the feature indication message from memory 411 and supplying the feature indication message to base station 101 which transmits the feature indication message to remote unit 103 via downlink communication signal 116 and displayed on an alpha-numeric display screen. By informing remote unit 103 that an incoming call is a feature-originated call, the called party may avoid unnecessary fees by refusing to answer the call since their voice-mail service may be accessed via PSTN 117 at a typically much lower cost. Next, at step 542 controller 401 transfers control back to MSC 109 and the logic flow ends at step 511.

Figure 6:
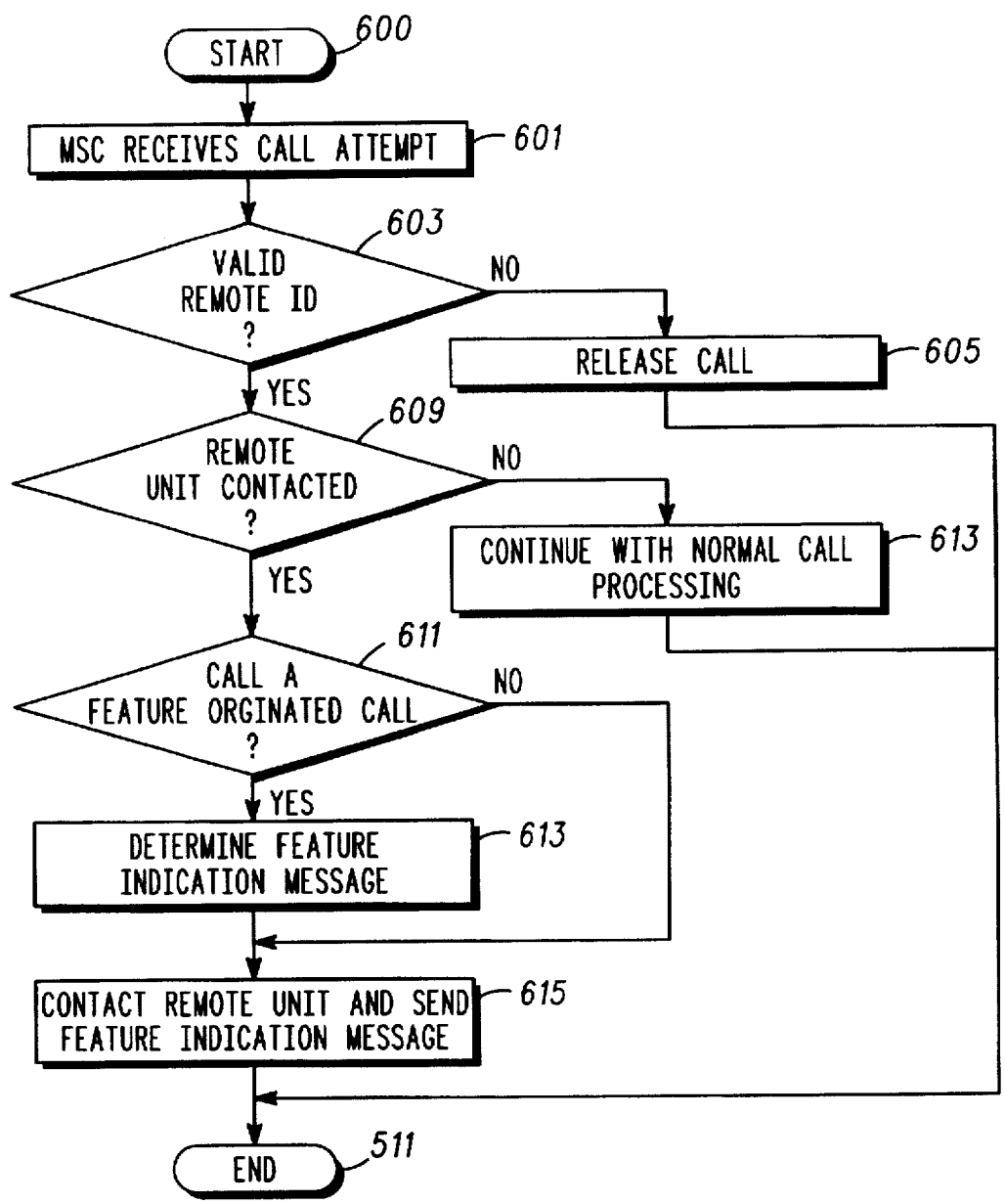
FIG. 6 is a flow chart illustrating a method of operating the wireless communication system of FIG. 1 in accordance with an alternate embodiment of the present invention.

FIG. 6 is a flow chart illustrating a method of operating wireless communication system 100 of FIG. 1 in accordance with an alternate embodiment of the present invention. The logic flow starts at step 600 where a feature-service call is placed to remote unit 103. In the alternate embodiment, the call contains information that indicates the call is a feature-originated call. For example, a feature-service call such as a facsimile (FAX), which may originate from PSTN (i.e. from communication unit 155) or cellular system 100 (i.e. from remote unit 127), may be placed for remote unit 103. In a preferred embodiment, the feature-service call contains information indicating it to be a feature-originated call. For example, in a preferred embodiment two-stage dialing is utilized, wherein the first stage contains feature indication information (such as a binary number indicating a feature) and the second stage contains the mobile destination number.

Continuing, at step 601 MSC 109 receives the call attempt and at step 603 call manager 205 accesses subscriber database/translator subsystem 207 and determines if a valid mobile identification was supplied by the call attempt. If, at step 603, subscriber database/translator 207 determines that the mobile identification is invalid, then at step 605, MSC 109 releases the call attempt, and the logic flow ends at step 607. If, at step 603, subscriber database/translator 207 determines that the mobile identification is valid, then at step 609, call manager 205 attempts to contact remote unit 103. In the preferred embodiment, the step of contacting remote unit 103 is accomplished via downlink communication signal 116 which is transmitted from the last base station that remote unit 103 communicated with. In situations where remote unit 103 is involved in a call, the step of contacting remote unit 103 is accomplished via down link communication on the traffic channel currently being utilized by remote unit 103.

Continuing, if at step 609, call manager 205 successfully contacts remote unit 103, then at step 611, call manager 205 determines if the call is a feature-originated call. As described above, in a preferred embodiment this determination is made by checking the first stage in a two-stage dialing process. If, at step 311 it is determined that the call is not a feature-originated call, then the logic flow continues to step 615 otherwise, at step 613 call manager determines a feature indication message associated with the two-stage dialing process and the logic flow continues to step 615. At step 615, call manager 205 contacts remote unit 103 via base station 101 and downlink communication signal 116. At this point the feature indication message is provided to remote unit 103. As discussed above, in a preferred embodiment the feature indication message may be supplied via a short message service or "Alert w/Info" depending on the communication system protocol.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method for informing a remote unit of a feature-originated call in a communication system where there exist a plurality of types of feature-originated calls, wherein the feature-originated call is being placed to the remote unit in response to a utilized feature service, the method comprising the steps of:

determining, by wireless infrastructure equipment in response to the utilized feature service that the feature-originated call needs to be provided to the remote unit to produce a feature service determination;

determining an availability of the remote unit;

determining a feature indication message based on the feature service determination, wherein the feature indication message is utilized to provide the remote unit with an indication of a specific type of feature-originated call from the plurality of feature-originated calls that needs to be provided to the remote unit;

determining a time period to send the feature indication message to produce a time period determination; and simultaneously sending the feature indication message along with the feature-originated call to the remote unit informing the remote unit of the feature-originated call, wherein the step of sending the message and the call is based on the feature service determination, the availability of the remote unit, and the time period determination.

2. The method of claim 1 wherein the time period determination is a next time the remote unit accesses a cellular system.

3. The method of claim 1 wherein the step of sending the feature indication message comprises the step of sending the feature indication message over a control channel.

4. The method of claim 1 wherein the step of sending the feature indication message comprises the step of sending the feature indication message over a traffic channel.

5. The method of claim 1 wherein the feature indication message is a text message.

6. The method of claim 1 wherein the step of sending comprises sending an "Alert w/Info" order to the remote unit.

7. The method of claim 1 wherein the step of sending comprises sending a short message service to the remote unit.

8. A method for informing a remote unit of a feature-originated call in a communication system where there exist a plurality of types of feature-originated calls, wherein the feature-originated call is being placed to the remote unit in response to a utilized feature service, the method comprising the steps of:

determining, by wireless infrastructure equipment in response to the utilized feature service that the feature-originated call needs to be provided to the remote unit to produce a feature service determination;

determining an availability of the remote unit to produce an availability determination;

determining a feature indication message based on the feature service determination, wherein the feature indication message is utilized to provide the remote unit with an indication of a specific type of feature-originated call from the plurality of feature-originated calls that needs to be provided to the remote unit;

determining a time period to send the feature indication message to the remote unit contacting the remote unit via a downlink communication signal; and simultaneously supplying the remote unit the feature indication message via the downlink communication signal and sending the feature-originated call to the remote unit to provide the remote unit with an indication of a type of feature-originated call, wherein the step of supplying and sending is based on the time period, the feature indication message, and the availability of the remote unit and is sent to the remote unit prior to providing the feature-originated call to the remote unit.

9. The method of claim 8 wherein the time period is a next time the remote unit accesses a cellular system.

10. The method of claim 8 wherein the step of supplying the remote unit the feature indication message comprises the step of sending the feature indication message over a control channel.

11. The method of claim 8 wherein the step of supplying the remote unit the feature indication message comprises the step of sending the feature indication message over a traffic channel.

12. The method of claim 8 wherein the feature indication message is a text message.

13. The method of claim 8 wherein the step of supplying comprises sending an "Alert w/Info" order to the remote unit.

14. The method of claim 8 wherein the step of supplying comprises sending a short message service to the remote unit.

15. An apparatus for informing a remote unit of a feature-originated call in a communication system where there exist a plurality of types of feature-originated calls, the apparatus comprising:

a Mobile Switching Center (MSC) for determining an availability of the remote unit to produce an availability determination;

a trigger manager coupled to the MSC, the trigger manager determining a feature indication message based on the feature-originated call, wherein the feature indication message is utilized to provide the remote unit with an indication of the specific type of feature-originated call from the plurality of feature-originated calls that needs to be provided to the remote unit, the trigger manager additionally determining a time period to send the feature indication message to the remote unit;

a controller coupled to the MSC for contacting the remote unit via a downlink communication signal;

a base station coupled to the MSC, the base station simultaneously supplying the remote unit the feature indication message and the feature-originated call via a downlink communication signal, wherein the step of supplying is based on the time period, the feature indication message, and the availability of the remote unit and is sent to the remote unit prior to providing the feature-originated call to the remote unit.

\* \* \* \* \*